United States Patent [19]

Bathrick et al.

[11] Patent Number: 4,776,365

[45] Date of Patent: Oct. 11, 1988

[54] NON-TURBULENT SHUT-OFF VALVE

[76] Inventors: Leeland M. Bathrick, 6820 New Hampshire Trail, Crystal Lake, Ill. 60012; Laddie F. Dobbs, 913 Madison, Wauconda, Ill. 60084

[21] Appl. No.: 28,875

[22] Filed: Mar. 24, 1987

[51] Int. Cl.[4] .................... F16K 43/00; F16K 25/00
[52] U.S. Cl. .............................. 137/329.02; 137/549
[58] Field of Search ............. 137/315, 329.01, 329.02, 137/329.03, 329.04, 549, 550

[56] References Cited

U.S. PATENT DOCUMENTS

| 485,055 | 10/1892 | Quinn | 137/329.02 |
| 594,895 | 12/1897 | O'Meara | 137/329.02 |
| 623,418 | 4/1899 | O'Meara | 137/329.02 |
| 662,249 | 11/1900 | Cadman | 137/329.03 |
| 735,039 | 7/1903 | O'Meara | 137/329.02 |
| 953,940 | 4/1910 | Beam | 137/329.03 |

Primary Examiner—George L. Walton

[57] ABSTRACT

A non-turbulent fluid shut-off valve with a shrouded movable valve member outside the flow stream when in its open position.

6 Claims, 3 Drawing Sheets

NON-TURBULENT SHUT-OFF VALVE

RELATED APPLICATION

This application discloses subject matter contained in our copending U.S. application Ser. No. 028,876, filed Mar. 24, 1987, entitled SHUT-OFF VALVE WITH INTEGRAL STRAINER, filed the same day as the present application.

BACKGROUND OF THE INVENTION

Flow control and shut-off valves have been used in industrial processing systems such as industrial refrigeration systems for over the last century, and thousands of improvements have been made in these valves and in the overall processing system since then.

The regulating or flow control valve is usually a condition responsive valve that modulates flow through the system in response to either an external or internal condition, and one form of a latter is a metering valve that modulates flow in response to upstream pressure.

In these industrial processing systems, a manually operable shut-off valve is usually positioned upstream from the metering valve, and this valve, for example, may be a bonnet type valve where the bonnet is essentially the top closure plate on the valve into which a manually operable valve stem is threaded. A valve member carried by the end of this stem engages a stationary valve seat in a valve body when the valve is in its closed position completely blocking flow through the valve. When the valve stem is unthreaded, the valve member moves away from the seat permitting flow through the shut-off valve to the regulating valve, and the shut-off valve is usually positioned in either its fully closed or fully opened position.

A strainer assembly is usually required in the flow line between the shut-off valve and the metering valve to minimize the passing of any foreign material into the metering valve and downstream into the other processing equipment associated with the system, such as refrigeration components. Heretofore, the strainer required a separate strainer body that included an inlet flange, an outlet flange, partitioned walls for the strainer seat, and a bottom cap removably attached to the strainer body by fasteners that permits the removal of the strainer for cleaning or replacement. This requirement for a strainer body and bottom cap significantly added to the cost of the processing system bearing in mind that the valves, flow lines, flow capacity, and therefore also the size of the components in these industrial processing systems are quite large. The strainer body is a metal sand casting that requires machining the inlet and outlet flanges, the strainer seats in the partition wall and the bottom plate as well as the strainer opening for the bottom plate and the bottom plate flange, all making the strainer assembly quite costly.

The shut-off valve assembly, while required to interrupt flow through the system when desired, is a major contributor to turbulent fluid flow in the system which decreases system efficiency. One reason for this is that the valve member carried by the valve stem remains in the flow stream even when in its open position.

It is a primary object of the present invention to ameliorate the problems and expense noted above in shut-off valve assemblies.

SUMMARY OF THE PRESENT INVENTION

In accordance with the present invention, a non-turbulent shut-off valve assembly is provided wherein a valve member carried by a valve stem in a valve body is completely withdrawn from the flow path of fluid through the valve body, and wherein components of the valve member are reversible to increase valve life. Toward these ends, the valve member takes the form of a cylindrical assembly having a substantially uniform diameter, symmetrical about a transverse plane bisecting the axial length of the valve member, with resilient annular seats mounted at each axial end thereof. The annular seat on the forward end of the valve member engages a frustoconical valve seat in a partition wall in the valve body that separates the valve body into an inlet section and an outlet section. The upper or rear annular seat on the valve member serves as a stop when engaging an annular stop in a bonnet closing the valve body when the valve member is in its open position. By removing the valve member from the valve stem, flipping it over and replacing it on the valve stem, the rear seat becomes the forward seat and the forward seat becomes the rear seat thereby doubling seat life on the valve member. This is due in part to the fact that the stop in the bonnet engages a different surface on the rear valve seat than does the frustoconical partition seat on the forward valve seat as will appear more clearly hereinbelow.

An important aspect of the present invention is the configuration of the shut-off valve assembly that permits this valve member to be withdrawn from the flow stream when the valve member is in its open position. This is accomplished by increasing the height of the bonnet on the valve body and providing the bonnet with an annular projection that is a shroud enclosing the valve as the valve is retracted upwardly into the shroud in the open position of the valve. The bottom edge of the shroud is outside the closest flow line defined by the inlet passage in the valve body. This shroud not only locates the valve member outside the inlet flow path, but also serves the very important function of isolating the rear side of the valve from the dynamic fluid pressure in the inlet section of the valve body. Furthermore, the annular stop in the bonnet isolates the rear side of the valve from both dynamic and static fluid pressure in the inlet section when the valve member is completely withdrawn and the annular stop in the bonnet engages the rear valve seat.

Another feature of the present valve member is its three piece construction that permits the annular valve seats to be reversed on the valve member to expose additional seating surfaces further increasing seat life.

Other objects and advantages of the present invention will appear in the detailed description set forth below.

DETAILED DESCRIPTION OF THE PREFERRED EMBODIMENT

Figure 1:
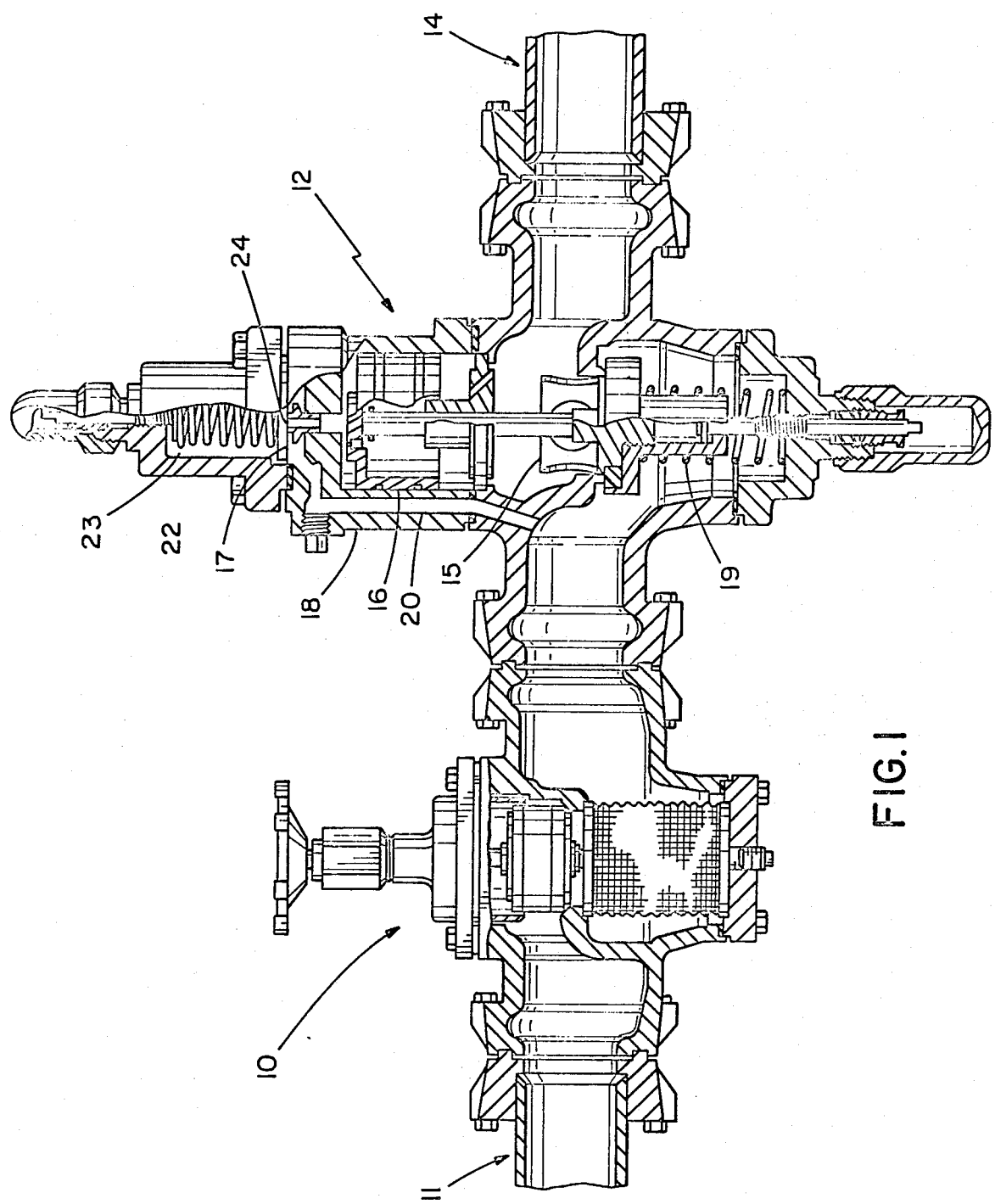
FIG. 1 is a partial longitudinal section illustrating the present non-turbulent shut-off valve assembly connected in series with a conventional metering valve positioned upstream from the metering valve.

Referring to the drawings, and particularly FIG. 1, a shut-off valve assembly 10, according to the present invention, is shown with its inlet connected to an inlet pipe 11 and its outlet connected to deliver fluid to a regulating valve assembly 12 that meters flow from the shut-off valve 10 to an outlet pipe 14 connected to deliver fluid under pressure to an industrial processing components such as in a refrigeration system.

The regulating valve assembly 12 forms no part of the present invention and is illustrated to show the function of the shut-off valve assembly 10 in an exemplary industrial processing system. Valve 12 includes a metering valve member 15 biased toward its minimum flow position by spring 19, and it is moved toward its open position by a piston 16 driven by fluid pressure in an upper chamber 17 in cylinder 18 that reacts against a diaphragm 22 biased by an adjustable spring assembly 23, chamber 17 communicates with upstream pressure through passage 20, and when fluid pressure in chamber 17 overcomes the force of spring assembly 23 on diaphram 22, it moves upwardly opening pilot port 24 and permitting flow through the port to the top side of piston 16, moving piston 16 downwardly against the biasing force of spring 19 to a balanced position.

Figure 2:
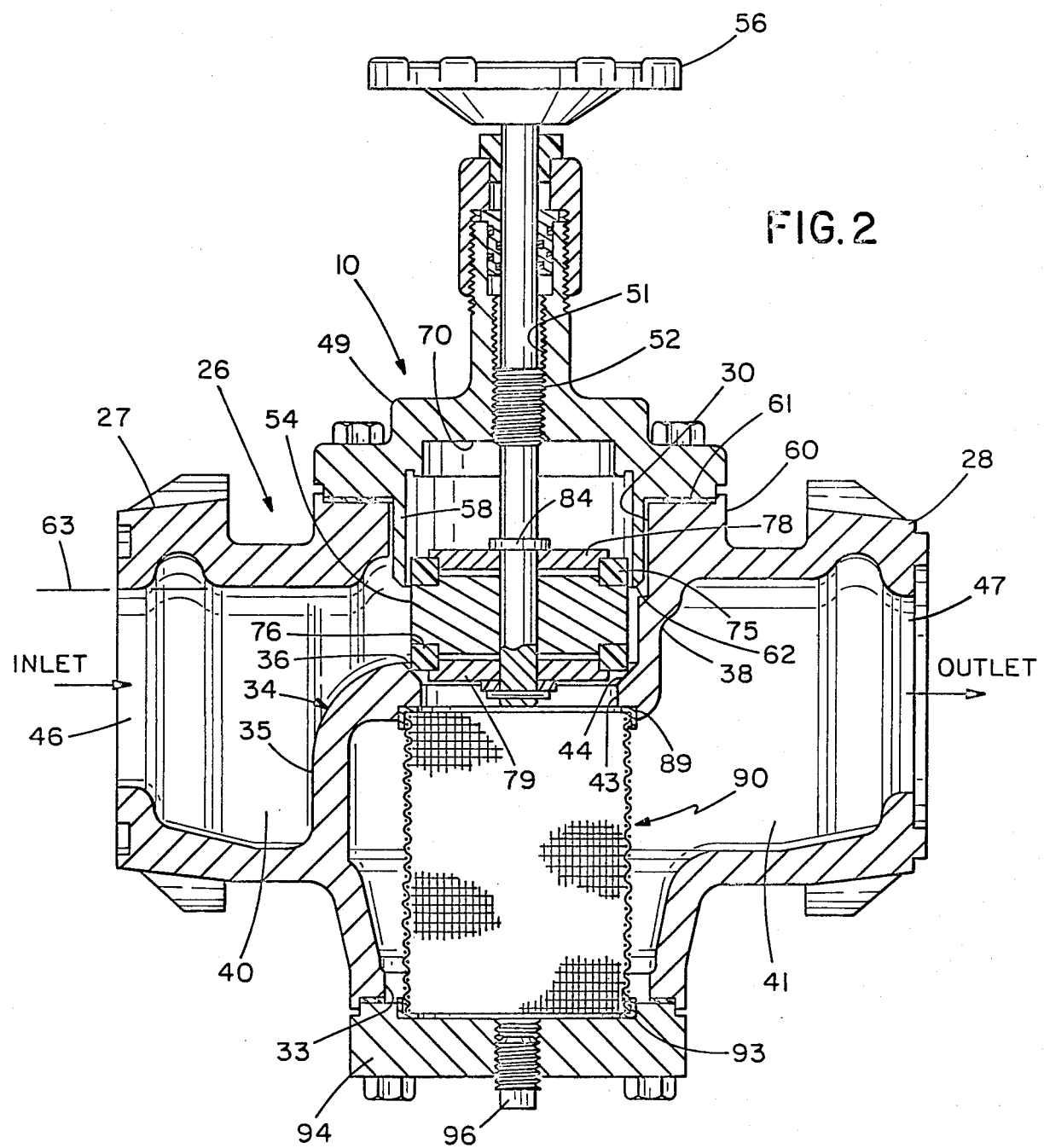
FIG. 2 is an enlarged longitudinal section of the non-turbulent shut-off valve assembly illustrated in FIG. 1 in its closed position.
Figure 3:
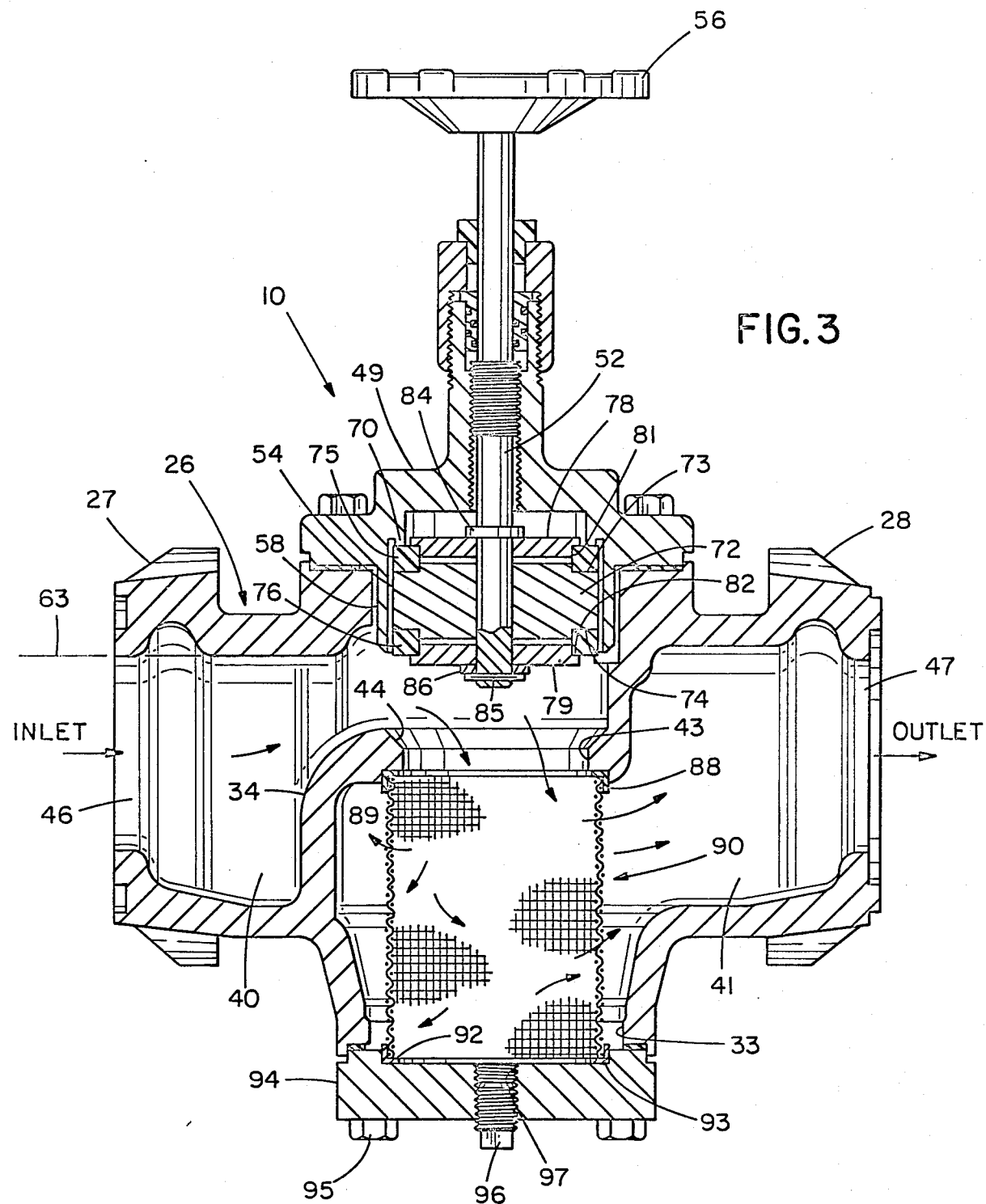
FIG. 3 is an enlarged longitudinal section of the non-turbulent shut-off valve assembly illustrated in FIG. 1 in its opened position.

As seen more clearly in FIGS. 2 and 3, the shut-off valve assembly 10 includes a sand cast valve body 26 having an inlet flange 27, an outlet flange 28, a central bonnet opening 30, a lower annular bottom plate opening 33, and a generally S-shaped partition wall 34 having a vertical portion 35, a horizontal portion 36, and another vertical portion 38.

The partition wall 34 separates the valve body into an inlet section 40 and an outlet section 41 connected only by a circular opening 43 in partition wall portion 36. Opening 43 includes a frustoconical valve seating surface 44.

The inlet flange 27 has an inlet opening 46 coaxially aligned with outlet flange 28 and outlet opening 47.

The central upper bonnet opening 30 in the valve body 26 is closed by a stepped annular bonnet 49 that has a lower threaded opening 51 that threadedly receives a valve stem 52 that carries a valve member assembly 54 on its lower end. Valve stem 52 is externally rotated by hand wheel 56 rotatably fixed to the upper end of the valve stem 52.

The bonnet 49 has an integral annular flange 58 that forms a shroud for the valve member assembly 54 when in its open position illustrated in FIG. 3. Upper annular flange 60 on valve body 26 and bonnet mounting surface 61 on its upper surface are positioned so that lower surface 62 of the shroud 58 lies above the uppermost flow line 63 of the inlet section 40. This permits the valve member assembly 54 to be completely withdrawn from the flow stream in its open position illustrated in FIG. 3.

Furthermore, the shroud 58 isolates the rear side of the valve member assembly 54 from dynamic fluid pressure in all open positions of the valve. The bonnet 49 is provided with an annular projection 70 that forms a stop for the valve member assembly 54 in its open position illustrated in FIG. 3, and it also functions to seal the rear surface of the valve member assembly 54 from static pressure.

The valve member assembly 54 includes a cylindrical valve member body 72 with annular recesses 73 and 74 at each end thereof that receive elastomeric annular seats 75 and 76, both of which are identical and have square cross-sections. Seat 76 is the forward seat engageable with partition seat 44 in the closed position of the valve member illustrated in FIG. 2, and seat 75 is the rear seat engageable with stop 70 when the valve member is in its open position illustrated in FIG. 3.

The valve seats 75 and 76 are held against valve member body 72 by identical seat plates 78 and 79 with annular recesses 81 and 82 that receive and clamp the annular seats 75 and 76 respectively.

The valve member assembly 54 is held axially against an integral flange 84 on valve stem 52 by a roll pin 85 that extends through a hole in the bottom f the valve stem 52 and reacts against a washer 86 that engages the seat plate 79.

The entire valve member assembly 54 is reversible on the stem 52 by removing roll pin 85, sliding the valve assembly 54 off the valve stem and reversing and replacing it on the valve stem. This switches the annular seat 75 from the rear stop seat to the forward valve seat which, of course, is done when the original valve seat 76 becomes worn. Note that annular stop 70 engages the upper flat surface of the rear seat 75 so that any wear caused by the stop does not affect the performance of this seat when t is switched to the forward position because the forward seat engages the frustoconical partition seat 44 at the corner of the valve seat.

Each of the valve seats 75 and 76 is reversible itself in valve assembly 54 by removing the valve assembly 54 from the stem, separating the seat plates 78 and 79 from the seats 75 and 76, and then flipping the seats. This, of course, exposes unworn surfaces on the valve seats 75 and 76 to further extend seat life.

The partition wall 34 has a counterbore 88 that receives and locates an annular ring 89 on the upper end of a strainer 90 positioned in outlet section 41 of the valve body 26. The lower end of strainer 90 has a ring 92 received and located in a counterbore 93 in bottom plate 94 that closes bottom plate opening 33 and is fastened to the valve body by fasteners 95. Bottom plate 94 has a plug 96 threaded in a central bore 97 therein that provides access to the interior of the strainer assembly 90 if desired. Plug 96 can be used as a drain plug.

The strainer assembly 90 can be removed for cleaning and replacement simply by removing bottom plate 94 with the valve member 54 in its closed position. Note that the valve member 54 is in the inlet section 40 while the strainer assembly 90 is in outlet section 41. With valve member 94 closed, the outlet section 41 is isolated from system pressure permitting the plate 94 to be removed without exposure to system pressure. The positioning of the strainer assembly 90 in the outlet section 41 surrounding the partition opening 43 and in axial alignment with valve member 54 permits fluid flow into the strainer internally and in an axial direction maximizing strainer effectiveness. In smaller versions of the valve assembly 10, shroud 58 may be formed in the body 26 rather than on bonnet 49.

We claim:

1. An industrial fluid flow shut-off valve assembly, comprising: a valve body having an inlet and an outlet, a partition wall with a frusto-conical valve seat therein separating the valve body into an inlet section and an outlet section with the inlet section communicating with the inlet and the outlet section communicating with the outlet, a valve member reciprocably mounted in the valve body movable from an open position permitting flow from the inlet section to the outlet section and a closed position engaging the valve seat in the partition wall blocking flow from the inlet section to the outlet section, said valve member being annular and having a substantially axially uniform cross section so that the forward end of the valve member is substantially the same size as the rear end thereof, an annular valve seat on each end of the valve member, and a valve stem removably receiving the valve member, said valve member being reversible on the valve stem so the annular seat on the rear end of the valve member can be the annular seat on the forward end of the valve member after valve member reversal on the stem, said valve member having upper and lower annular grooves extending from the periphery of the valve member receiving the first and second valve seats so that the valve seats are exposed to the periphery of the valve member, a first removable plate clamping the upper one of the valve seats to the valve member and a second removable plate clamping the lower one of the valve seats to the valve member without covering the outer periphery of the valve seats so that upon removal of the plates the valves seats are free from the valve member for easy replacement or reversal and so that either valve seat may be utilized to engage and seat in the valve body frusto-conical valve seat and either valve seat may be easily replaced or reversed on itself universally without the use of tools for prying from the valve member and without damaging the valve seats.

2. An industrial fluid flow shut-off valve assembly as defined in claim 1, wherein the annular valve seats on the valve member are axially reversible on the valve member to expose new seating surfaces.

3. An industrial fluid flow shut-off valve assembly as defined in claim 1, an annular stop in the valve body engageable with a first surface on the annular seat on the rear of the valve member when the valve member is in its open position, said valve seat in the partition wall engaging a second surface on the annular seat on the rear of the valve member after reversal of the valve member and when the valve member is in its closed position so that the annular stop and the wall valve seat engage different surfaces on the annular seats or the valve member and thereby increase seat life.

4. An industrial fluid flow shut-off valve assembly, as defined in claim 1, including an annular shroud in the valve body adapted to receive the valve member when in its open position to isolate the valve member from the fluid stream moving from the inlet section of the valve body to its outlet section.

5. An industrial fluid flow shut-off valve assembly, as defined in claim 4, wherein the end of the annular shroud is positioned outside the flow stream of fluid flowing from the inlet section to the outlet section.

6. An industrial fluid flow shut-off valve assembly as defined in claim 4, wherein the end of the annular shroud is positioned outside the flow stream of fluid flowing from the inlet section to the outlet section.

* * * * *